US012646179B2

(12) United States Patent
Sada

(10) Patent No.: US 12,646,179 B2
(45) Date of Patent: Jun. 2, 2026

(54) IMAGE PROCESSING APPARATUS, IMAGE PROCESSING METHOD, AND COMPUTER READABLE RECORDING MEDIUM

(71) Applicant: NEC Corporation, Tokyo (JP)

(72) Inventor: Youki Sada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 18/374,722

(22) Filed: Sep. 29, 2023

(65) Prior Publication Data

US 2024/0119601 A1 Apr. 11, 2024

(30) Foreign Application Priority Data

Oct. 6, 2022 (JP) ................................. 2022-161355

(51) Int. Cl.
| | |
|---|---|
| *G06T 7/194* | (2017.01) |
| *G06T 7/20* | (2017.01) |
| *G06V 10/74* | (2022.01) |
| *G06V 10/771* | (2022.01) |
| *G06V 10/82* | (2022.01) |

(52) U.S. Cl.
CPC ............ *G06T 7/194* (2017.01); *G06V 10/761* (2022.01); *G06V 10/771* (2022.01); *G06T 2207/20084* (2013.01); *G06V 2201/07* (2022.01)

(58) Field of Classification Search
USPC .......................... 382/103, 173, 155–156, 159
See application file for complete search history.

(56) References Cited

U.S. PATENT DOCUMENTS

| | | | | |
|---|---|---|---|---|
| 11,816,895 | B2 * | 11/2023 | Chen ..................... | G06V 10/454 |
| 2019/0311202 | A1 | 10/2019 | Lee et al. | |
| 2021/0256266 | A1 * | 8/2021 | Chen ...................... | G06V 20/46 |
| 2024/0119601 | A1 * | 4/2024 | Sada ...................... | G06V 10/82 |

FOREIGN PATENT DOCUMENTS

| | | |
|---|---|---|
| JP | 2020-013206 A | 1/2020 |
| JP | 2021-128705 A | 9/2021 |
| JP | 2022-018173 A | 1/2022 |
| JP | 2022-020353 A | 2/2022 |
| JP | 2022-043651 A | 3/2022 |

OTHER PUBLICATIONS

Mathias Parger, et al., "DeltaCNN: End-to-End CNN Inference of Sparse Frame Differences in Videos", Graz University of Technology, Meta Reality Labs, Mar. 8, 2022.
JP Office Action for JP Application No. 2022-161355, mailed on Apr. 21, 2026 with English Translation.

* cited by examiner

*Primary Examiner* — Ishrat I Sherali
(74) *Attorney, Agent, or Firm* — Sughrue Mion, PLLC

(57) ABSTRACT

An image processing apparatus includes: a foreground information generating unit that generates, from a frame constituting video frame, foreground information indicating a region of the frame in which a target is present; and a model applying unit that applies the frame and the foreground information generated from the frame to a neural network model that has performed machine learning of an image feature map of the target.

8 Claims, 10 Drawing Sheets

FRAME

DIFFERENCE
INFORMATION

FOREGROUND
INFORMATION

IMAGE PROCESSING APPARATUS, IMAGE PROCESSING METHOD, AND COMPUTER READABLE RECORDING MEDIUM

CROSS-REFERENCE TO RELATED APPLICATION

This application is based upon and claims the benefit of priority from Japanese patent application No. 2022-161355, filed on Oct. 6, 2022, the disclosure of which is incorporated herein in its entirety by reference.

BACKGROUND OF THE INVENTION

1. Field of the Invention

The present disclosure relates to an image processing apparatus and an image processing method in which image processing is executed, and further relates to a computer-readable recording medium in which a program for realizing the image processing apparatus and image processing method is recorded.

2. Background Art

In recent years, a technique has been proposed of performing processing such as extracting an object from video frame output from a camera, identifying the behavior of the extracted object, and further recognizing a certain situation in a video frame. Such a technique is used in various monitoring systems, allowing monitoring systems to automatically detect a suspicious individual in a facility or the like.

Furthermore, generally speaking, processing of extracting an object from video frame is performed by inputting frames constituting the video frame to a machine neural network model that has performed machine learning of a feature map of the extraction-target object. However, processing load would increase, and processing speed would decrease should all frames be inputted to the machine neural network model.

As a method for suppressing a decrease in processing speed, there is a method of using a first machine neural network model with high recognition accuracy but low processing speed, and a second machine neural network model with low recognition accuracy but high processing speed. In this method, key frames are set at preset intervals; furthermore, the key frames are input to the first machine neural network model, and the rest of the frames are input to the second machine neural network model.

Furthermore, in this method, it is also possible to input high-velocity frames to the first machine neural network model and low-velocity frames to the second machine neural network model, instead of setting key frames at preset intervals. In such a manner, processing load for frames other than key frames is reduced according to the above-described method; thus, a decrease in processing speed can be suppressed accordingly.

Furthermore, Non-patent document 1 proposes a method according to which a decrease in processing speed can be further suppressed compared to the above-described method. According to the method disclosed in Non-patent document 1, a key frame is input to a machine neural network model, as is the case in conventional technology; however, for the other frames, a difference from the key frame is extracted, and only the extracted difference is input to the machine neural network model. Subsequently, a result output from the machine neural network model when only a difference is input is synthesized with a result output from the machine neural network model when the key frame is input. In such a manner, processing load for frames other than key frames is further reduced according to the method disclosed in Non-patent document 1. Accordingly, the effect of suppressing a decrease in processing speed is further enhanced.

Non-Patent Document 1: Mathias Parger, et al., "DeltaCNN: End-to-End CNN Inference of Sparse Frame Differences in Videos", Graz University of Technology, Meta Reality Labs, 8 Mar. 2022

However, the above-described method disclosed in Non-patent document 1 has the following problems. First of all, according to this method, differences need to be extracted accurately in order to enhance recognition accuracy, and there is a problem that a decrease in recognition accuracy would occur as a result of a slight movement of the camera. In addition, there is a problem that, because camera noise is extracted as differences and processing for removing noise is thus necessary, the improvement in processing speed is limited. Furthermore, in order to remove noise accurately, it needs to be determined frame by frame whether the threshold for the processing needs to be updated. The improvement in processing speed is also limited by this determination processing.

An example object of the invention is to enable a decrease in processing speed to be suppressed while maintaining recognition accuracy in image processing in which video frame is input.

SUMMARY

In order to achieve the above-described object, an image processing apparatus includes:

a foreground information generating unit that generates, from a frame constituting video frame, foreground information indicating a region of the frame in which a target is present; and a model applying unit that applies the frame and the foreground information generated from the frame to a neural network model that has performed machine learning of an image feature map of the target.

In order to achieve the above-described object, an image processing apparatus method includes:

a foreground information generating step of generating, from a frame constituting video frame, foreground information indicating a region of the frame in which a target is present; and a model applying step of applying the frame and the foreground information generated from the frame to a neural network model that has performed machine learning of an image feature map of the target.

In order to achieve the above-described object, a computer readable recording medium according to an example aspect of the invention is a computer readable recording medium that includes recorded thereon a program, the program including instructions that cause the computer to carry out:

a foreground information generating step of generating, from a frame constituting video frame, foreground information indicating a region of the frame in which a target is present; and a model applying step of applying the frame and the foreground information generated from the frame to a neural network model that has performed machine learning of an image feature map of the target.

As described above, according to the invention, it is possible to enable a decrease in processing speed to be suppressed while maintaining recognition accuracy in image processing in which video frame is input.

EXAMPLE EMBODIMENT

First Example Embodiment

In the following, an image processing apparatus, an image processing method, and a program in a first example embodiment will be described with reference to FIGS. 1 to 5.

[Apparatus Configuration]

Figure 1:
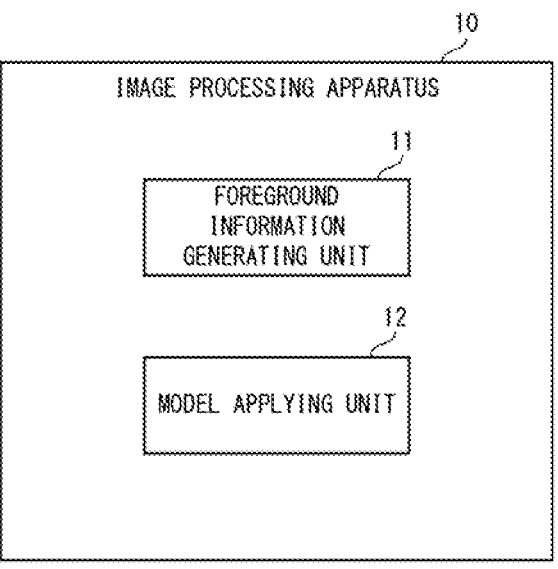
FIG. 1 is a configuration diagram illustrating the schematic configuration of the image processing apparatus in the first example embodiment.

First, a schematic configuration of the image processing apparatus in the first example embodiment will be described with reference to FIG. 1. FIG. 1 is a configuration diagram illustrating the schematic configuration of the image processing apparatus in the first example embodiment.

An image processing apparatus 10 in the first example embodiment illustrated in FIG. 1 is an apparatus that executes image processing (for example, object detection, behavior recognition, and/or the like) in which image data (video frame) is input. As illustrated in FIG. 1, the image processing apparatus 10 includes a foreground information generating unit 11 and a model applying unit 12.

The foreground information generating unit 11 generates, from a frame constituting video frame, foreground information indicating a region of the frame in which a target is present (hereinafter "target presence region"). The model applying unit 12 applies the frame and the foreground information generated from the frame to a neural network model. The neural network model has performed machine learning of an image feature map of the target.

The first example embodiment differs from conventional technology in that, because a frame and foreground information generated from the frame are input to a neural network model in such a manner, image processing such as object detection is performed using a target presence region included in the foreground information. Thus, according to the first example embodiment, a decrease in processing speed can be suppressed while maintaining recognition accuracy in image processing in which video frame is input.

Figure 2:
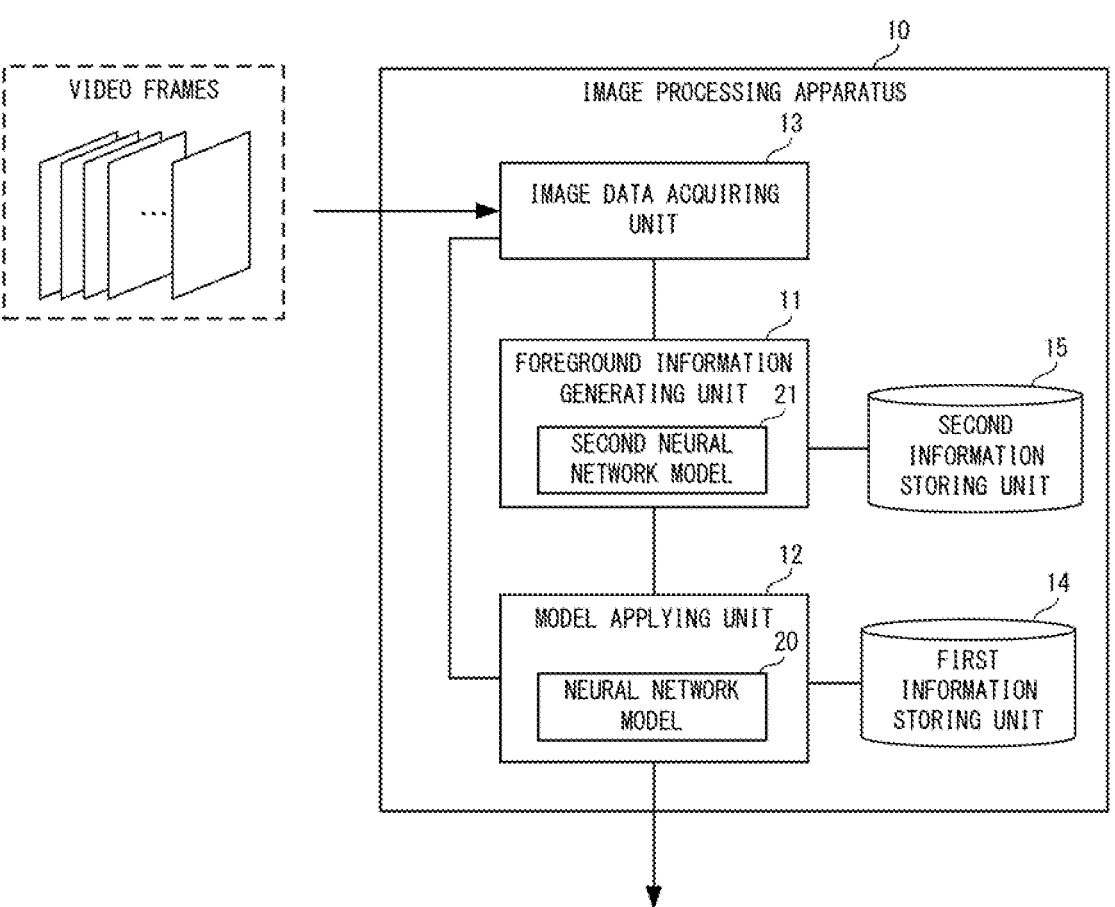
FIG. 2 is a configuration diagram illustrating the configuration of the image processing apparatus in the first example embodiment in detail.
Figure 3:
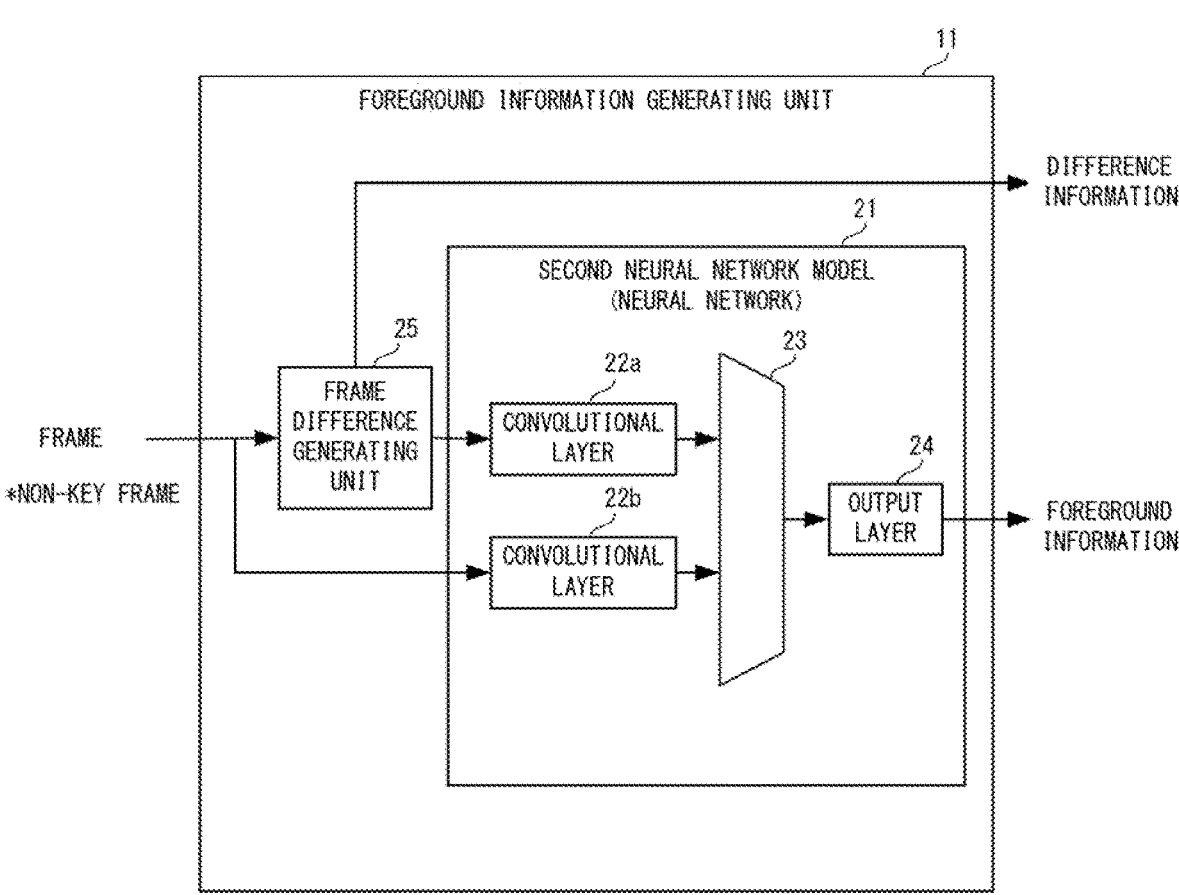
FIG. 3 is a diagram illustrating the configuration of the foreground information generating unit in the first example embodiment in detail.
Figure 4:
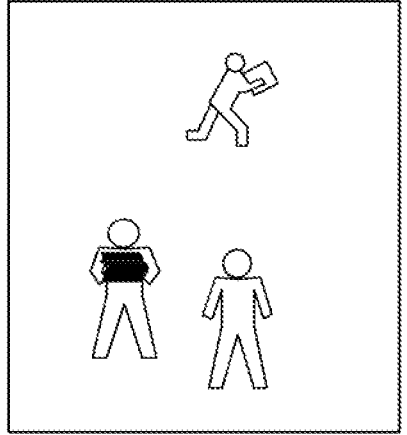
FIG. 4 is a diagram illustrating examples of foreground information and difference information generated in the first example embodiment.
Figure 4:
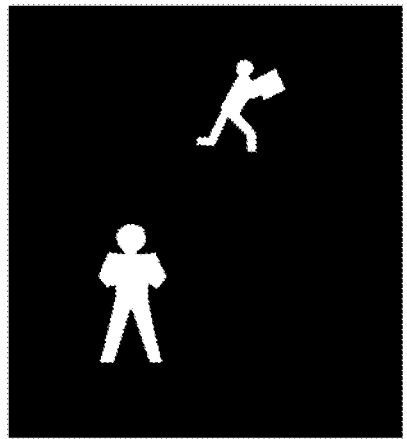
Figure 4:
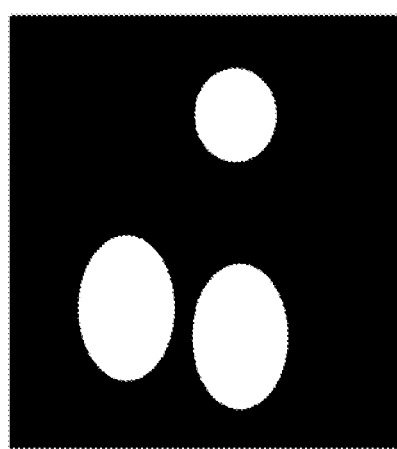

Subsequently, the configuration and functions of the image processing apparatus in the first example embodiment will be described in detail with reference to FIGS. 2 to 4. FIG. 2 is a configuration diagram illustrating the configuration of the image processing apparatus in the first example embodiment in detail. FIG. 3 is a diagram illustrating the configuration of the foreground information generating unit in the first example embodiment in detail. FIG. 4 is a diagram illustrating examples of foreground information and difference information generated in the first example embodiment.

As illustrated in FIG. 2, in the first example embodiment, the image processing apparatus includes an image-data acquiring unit 13, a first information storing unit 14, and a second information storing unit 15, in addition to the foreground information generating unit 11 and the model applying unit 12 described above.

When a processing-target video frame is input, the image-data acquiring unit 13 acquires the input frame, and inputs the acquired frame to the foreground information generating unit 11 and the model applying unit 12. Furthermore, in accordance with a preset rule, the image-data acquiring unit 13 designates relevant frames as key frames. As an example of the preset rule, a rule such as the following can be mentioned: "designate acquired frame as key frame at preset intervals".

In the first example embodiment, when a frame is input, the foreground information generating unit 11 determines whether the input frame is a key frame. Furthermore, if the input frame is a non-key frame, which is a frame other than a key frame that is designated in advance, the foreground information generating unit 11 generates foreground information from the frame. Also, in this case, the foreground information generating unit 11 further generates, in addition to the foreground information, difference information indicating a difference between the input frame and the key frame closest in time to the input frame.

Specifically, as illustrated in FIG. 3, the foreground information generating unit 11 includes a second neural network model 21 and a frame difference generating unit 25. If the input frame is not a key frame (if the input frame is a non-key frame), the frame difference generating unit 25 extracts a difference between the input frame and the key frame closest in time to the input frame, and generates difference information using the extracted difference.

Specifically, for example, the frame difference generating unit 25, for each pixel, compares the luminance of the key frame and the luminance of the input frame, and generates difference information by setting "1" if the difference is greater than or equal to a threshold and setting "0" if the difference is smaller than the threshold. The generated difference information is input to the model applying unit 12. One example of the input frame is illustrated in the upper part of FIG. 4, and one example of the generated difference information is illustrated in the middle part of FIG. 4. In the difference information, the luminance of the person standing still is "0".

Furthermore, in the first example embodiment, the configuration of the foreground information generating unit 11 is not limited to the example in FIG. 3. For example, the foreground information generating unit 11 may include a convolutional layer functioning as an image filter on the input side of the frame difference generating unit 25.

Furthermore, the foreground information generating unit 11 generates foreground information by applying the difference information to the second neural network model 21, or specifically, by inputting the difference information generated by the frame difference generating unit 25 and the input frame to the second neural network model 21, as illustrated in FIG. 3.

Specifically, a definition of a neural network model structure and parameters for constructing the second neural network model 21 are stored in advance in the second information storing unit 15. Accordingly, the foreground information generating unit 11 constructs the second neural network model 21 illustrated in FIG. 3 by reading the definition and the parameters from the second information storing unit 15 and using the definition and the parameters.

In the example in FIG. 3, the second neural network model 21 is formed by a convolutional neural network, and includes convolutional layers 22a and 22b, a concatenate layer 23, and an output layer 24. The difference information is input to the convolutional layer 22a, and the frame is input to the convolutional layer 22b.

Furthermore, machine learning of the second neural network model 21 is performed using, as training data, difference information indicating an inter-frame difference and a corresponding target feature map. That is, the second neural network model 21 performs machine learning of relationships between inter-frame differences and target feature maps. Parameters generated or updated by the machine learning are stored in the second information storing unit 15.

The second neural network model 21 is formed by a convolutional neural network as described above in the example in FIG. 3; however, the first example embodiment is not limited to this example. For example, the second neural network model 21 may be formed by a multilayer perceptron (MLP).

In the first example embodiment, the model applying unit 12 constructs a neural network model 20 that has performed machine learning of the above-described image feature map of the target. Furthermore, if an input frame is a non-key frame, and foreground information and difference information have been generated by the foreground information generating unit 11, the model applying unit 12 also applies the foreground information and the difference information to the neural network model 20 in addition to the input frame. On the other hand, if the input frame is a key frame, the model applying unit 12 applies only the input key frame to the neural network model 20.

Specifically, a definition of a neural network model structure and parameters for constructing the neural network model 20 are stored in advance in the first information storing unit 14. Accordingly, the model applying unit 12 constructs the neural network model 20 by reading the definition and the parameters from the first information storing unit 14 and using the definition and the parameters.

In the first example embodiment, the neural network model 20 is formed by a neural network. The neural network includes an input layer, a hidden layer (intermediate layer), and an output layer. The machine learning of the neural network model 20 is performed using, as training data, an image feature map of a target and a label indicating the target (information indicating a behavior, an action, or the like of the target). The neural network model 20 performs machine learning of relationships between target feature maps and labels. Parameters generated or updated by the machine learning are stored in the first information storing unit 14.

Note that the neural network model 20 and the second neural network model 21 are each practically implemented by a machine learning program executed on a computer loading a definition and parameters. Furthermore, in the first example embodiment, the neural network model 20 and the second neural network model 21 may each be implemented on an apparatus (computer) that is different from the image processing apparatus 10.

[Apparatus Operations]

Figure 5:
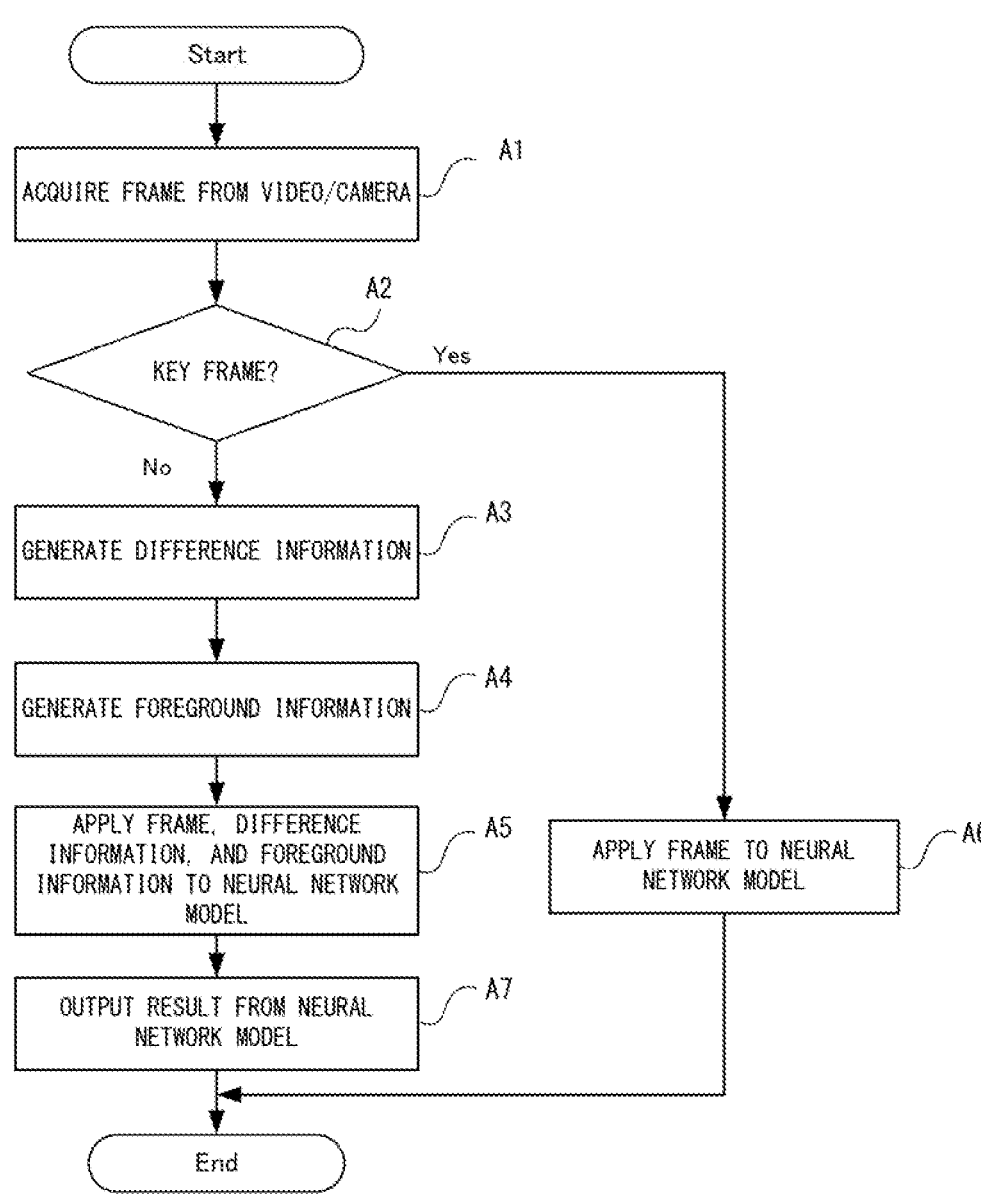
FIG. 5 is a flowchart illustrating the operations of the image processing apparatus in the first example embodiment.

Next, the operations of the image processing apparatus 10 in the first example embodiment will be described with reference to FIG. 5. FIG. 5 is a flowchart illustrating the operations of the image processing apparatus in the first example embodiment. FIGS. 1 to 4 will be referred to as needed in the following description. Furthermore, in the first example embodiment, an image processing method is implemented by causing the image processing apparatus 10 to operate. Accordingly, the following description of the operations of the image processing apparatus 10 is substituted for the description of the image processing method in the first example embodiment.

First of all, it is assumed that the model applying unit 12 has constructed the neural network model 20 in advance by reading the definition and the parameters from the first information storing unit 14 and using the definition and the parameters. It is also assumed that the foreground information generating unit 11 has constructed the second neural network model 21 in advance by reading the definition and the parameters from the second information storing unit 15 and using the definition and the parameters.

As illustrated in FIG. 5, when a processing-target video frame is input, the image-data acquiring unit 13 acquires the input frame (step A1). Furthermore, the image-data acquiring unit 13 inputs the acquired frame to the foreground information generating unit 11 and the model applying unit 12.

In step A1, the image-data acquiring unit 13 executes preprocessing on the acquired frame, as necessary. As examples of the preprocessing, the resizing of the frame, color conversion, the cutting out of one or more images, the rotation of the images, etc., can be mentioned, for example. Furthermore, in accordance with the preset rule, the image-data acquiring unit 13 designates relevant frames as key frames.

Next, it is determined by the foreground information generating unit 11 whether the frame acquired in step A1 is a key frame (step A2).

If the result of the determination in step A2 is that the frame acquired in step A1 is not a key frame, the frame difference generating unit 25 of the foreground information generating unit 11 extracts a difference between the frame acquired in step A1 and a key frame that is closest in time to the frame acquired in step A1, and generates difference information using the extracted difference (step A3).

Next, the foreground information generating unit 11 inputs the difference information generated in step A3 and the frame acquired in step A1 to the second neural network model 21 and thereby generates foreground information (step A4).

Next, the model applying unit 12 applies, to the neural network model 20, the frame acquired in step A1, the difference information generated in step A3, and the foreground information generated in step A4 (step A5).

Furthermore, if the result of the above-described determination in step A2 is that the frame acquired in step A1 is a key frame, the processing by the foreground information generating unit 11 is not executed, and the model applying unit 12 applies the frame acquired in step A1 to the neural network model 20 (step A6).

After executing step A5 or A6, the model applying unit 12 outputs the result output from the neural network model 20 to the outside (step A7). As examples of the output destination, a monitoring-system control apparatus, etc., can be mentioned, for example. Furthermore, the above-described steps A1 to A7 are repeatedly executed until an instruction to terminate processing is provided.

Effects of First Example Embodiment

As described above, in the first example embodiment, foreground information is also applied to the neural network model 20 in addition to conventionally used difference information. Thus, the problem that a decrease in recognition accuracy occurs as a result of a slight movement of the camera, and the problem that camera noise is extracted as differences are resolved. Due to this, according to the first example embodiment, a decrease in processing speed can be suppressed while maintaining recognition accuracy in image processing in which video frame is input.

Furthermore, as described above, a neural network is used as the neural network model 20 in the first example embodiment. Accordingly, according to the first example embodiment, execution speed can be improved while maintaining recognition accuracy in a neural network to which video frame is input, in particular.

[Program]

It suffices for the program in the first example embodiment to be a program that causes a computer to carry out steps A1 to A7 illustrated in FIG. 5. By installing this program on a computer and executing the program, the image processing apparatus and the image processing method in the first example embodiment can be realized. In this case, one or more processors of the computer function and perform processing as the foreground information generating unit 11, the model applying unit 12, and the image-data acquiring unit 13. As examples of the computer, a general-purpose PC, a smartphone, a tablet-type terminal device, an embedded computer, and the like can be mentioned.

Furthermore, in the first example embodiment, the first information storing unit 14 and the second information storing unit 15 may be realized by storing data files constituting the first information storing unit 14 and the second information storing unit 15 in a storage device such as a hard disk provided in the computer, or may be realized by a storage device provided in a different computer.

Furthermore, the program in the first example embodiment may be executed by a computer system constructed from a plurality of computers. In this case, the computers may each function as one of the foreground information generating unit 11, the model applying unit 12, and the image-data acquiring unit 13, for example.

Second Example Embodiment

Next, an image processing apparatus, an image processing method, and a program in a second example embodiment will be described with reference to FIGS. 6 to 8.

[Apparatus Configuration]

First, a schematic configuration of the image processing apparatus in the second example embodiment will be described with reference to FIGS. 6 and 7. FIG. 6 is a configuration diagram illustrating the configuration of the image processing apparatus in the second example embodiment. FIG. 7 is a diagram illustrating the configuration of the foreground information generating unit in the second example embodiment in detail.

Figure 6:
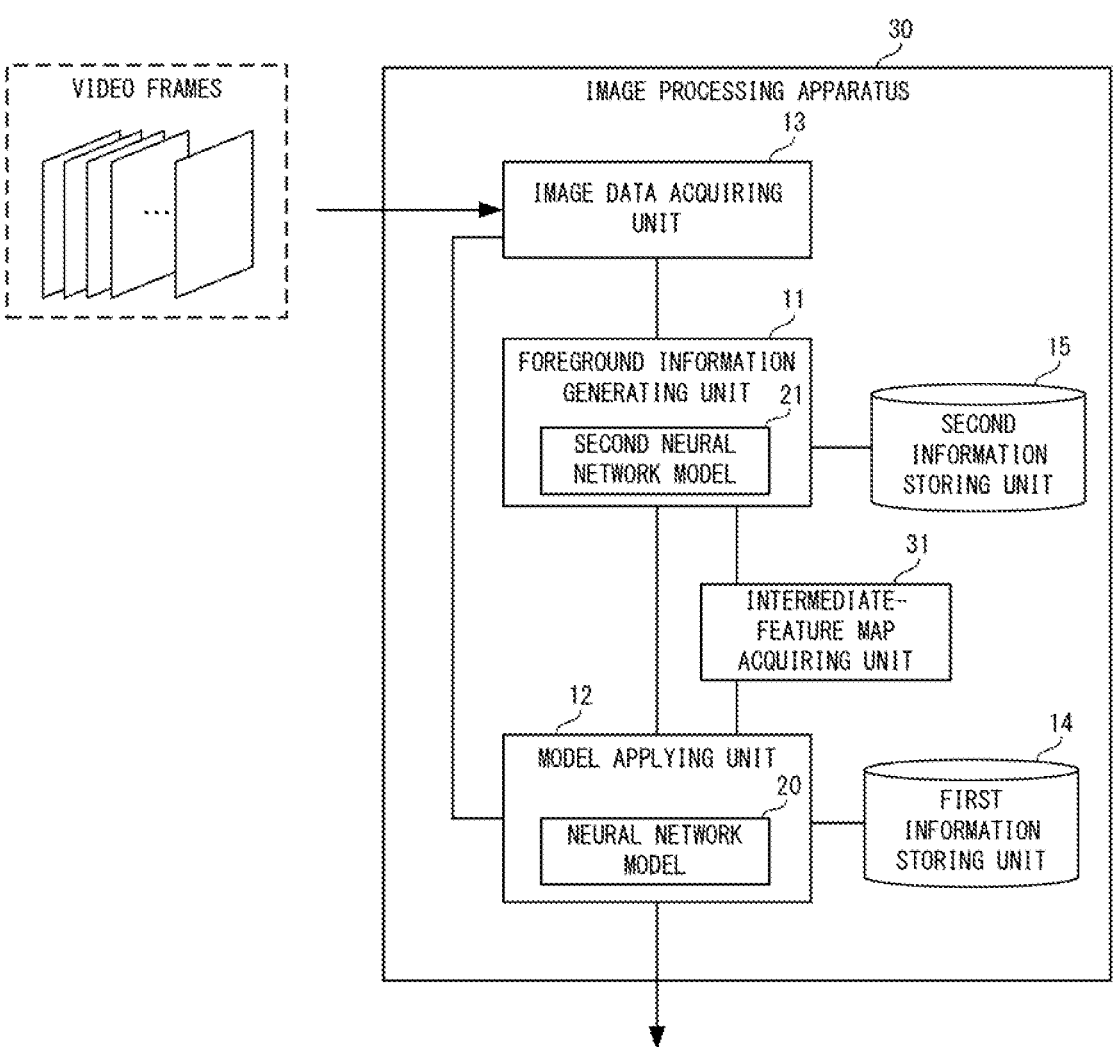
FIG. 6 is a configuration diagram illustrating the configuration of the image processing apparatus in the second example embodiment.

As illustrated in FIG. 6, similarly to the image processing apparatus 10 in the first example embodiment illustrated in FIG. 2, an image processing apparatus 30 in the second example embodiment includes the foreground information generating unit 11, the model applying unit 12, the image-data acquiring unit 13, the first information storing unit 14, and the second information storing unit 15. However, the image processing apparatus 30 in the second example embodiment includes an intermediate feature map acquiring unit 31 in addition to the above-described components, and differs from the image processing apparatus 10 in the first example embodiment in this regard. In the following, description will be provided focusing on differences from the first example embodiment.

In the second example embodiment, the intermediate feature map acquiring unit 31 acquires an intermediate feature map from the intermediate layer of the neural network model 20, which is a neural network, and inputs the acquired intermediate feature map to the foreground information generating unit 11. Furthermore, in the second example embodiment, the foreground information generating unit 11 generates foreground information and difference information using an intermediate feature map when a frame earlier than the input frame was applied to the neural network model 20.

Figure 7:
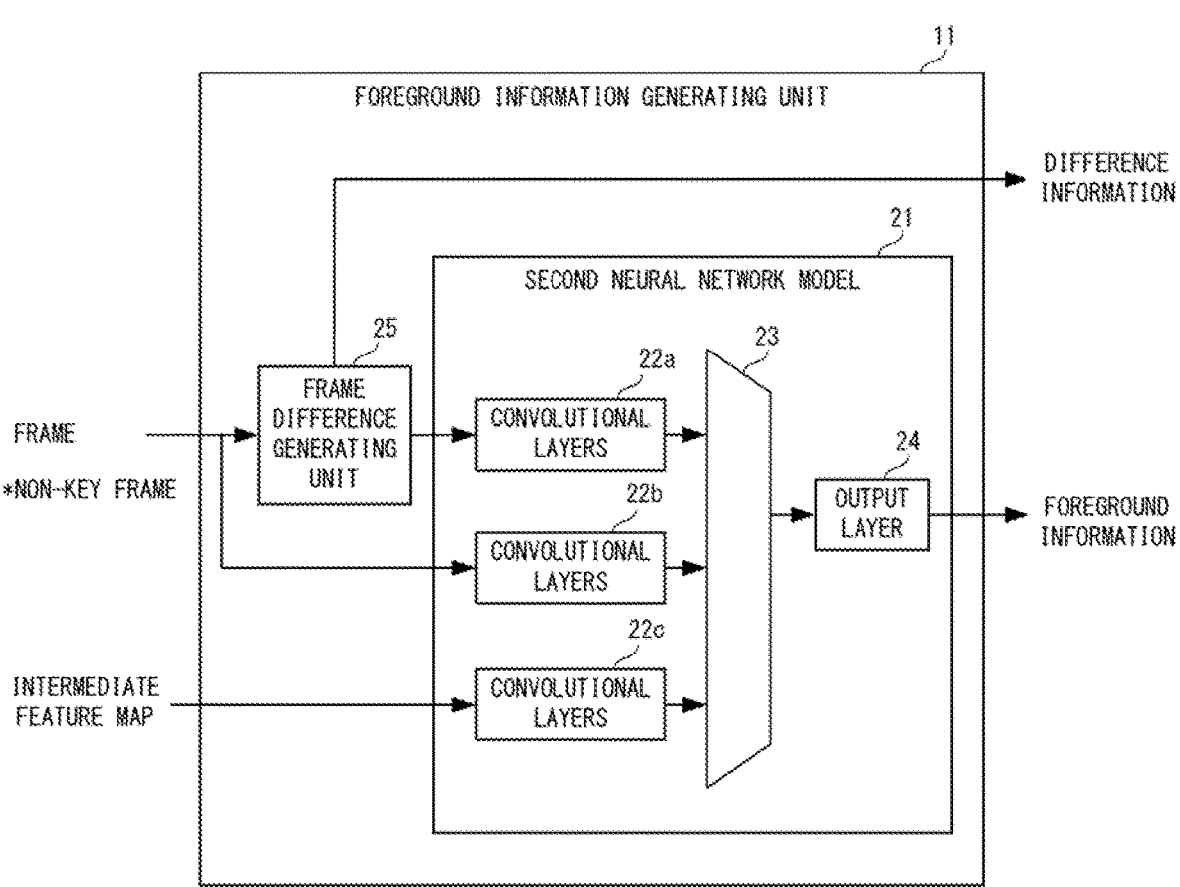
FIG. 7 is a diagram illustrating the configuration of the foreground information generating unit in the second example embodiment in detail.

Specifically, in the second example embodiment, the second neural network model 21 further includes a convolutional layer 22*c* in addition to the convolutional layers 22*a* and 22*b*, the concatenate layer 23, and the output layer 24, as illustrated in FIG. 7. Furthermore, an intermediate feature map when an earlier-input frame was applied to the neural network model 20 is input to the convolutional layer 22*c*.

Because an intermediate feature map is input to the second neural network model 21 in such a manner, the second neural network model 21 can regress a target presence region in foreground information using the intermediate feature map. Thus, according to the second example embodiment, the accuracy of a target presence region in foreground information can be enhanced compared to the first example embodiment.

[Apparatus Operations]

Next, the operations of the image processing apparatus 30 in the second example embodiment will be described with reference to FIG. 8. FIG. 8 is a flowchart illustrating the operations of the image processing apparatus in the second example embodiment. FIGS. 6 and 7 will be referred to as needed in the following description. Furthermore, in the second example embodiment, an image processing method is implemented by causing the image processing apparatus 30 to operate. Accordingly, the following description of the operations of the image processing apparatus 30 is substituted for the description of the image processing method in the second example embodiment.

First of all, it is assumed that the model applying unit 12 has constructed the neural network model 20 in advance by reading the definition and the parameters from the first information storing unit 14 and using the definition and the parameters. It is also assumed that the foreground information generating unit 11 has constructed the second neural network model 21 in advance by reading the definition and the parameters from the second information storing unit 15 and using the definition and the parameters. Furthermore, it is assumed that, each time later-described steps B6 and B7 are executed, the intermediate feature map acquiring unit 31 acquires an intermediate feature map from the intermediate layer of the neural network model 20.

Figure 8:
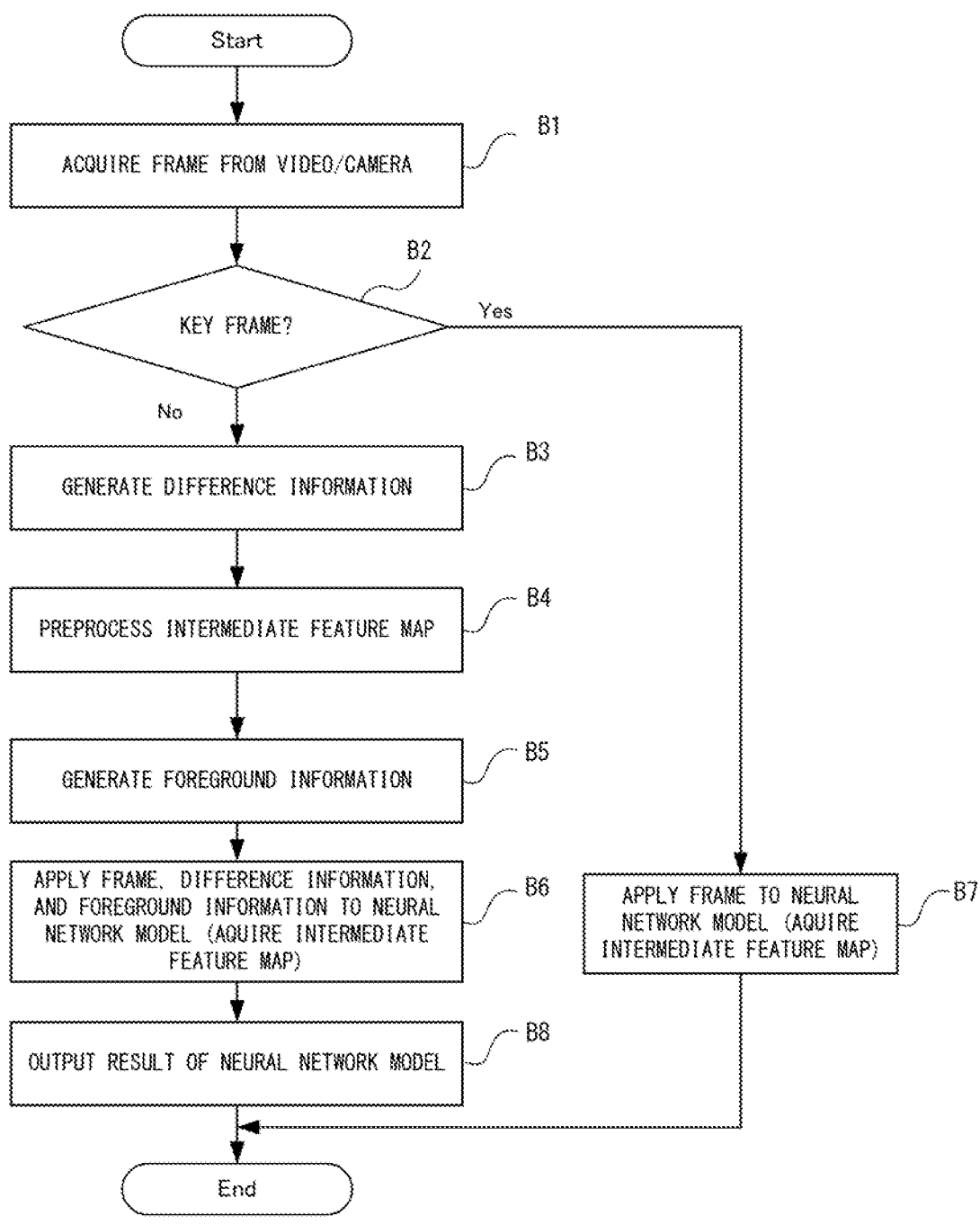
FIG. 8 is a flowchart illustrating the operations of the image processing apparatus in the second example embodiment.

As illustrated in FIG. 8, when a processing-target video frame is input, the image-data acquiring unit 13 acquires the input frame (step B1). Step B1 is similar to step A1 illustrated in FIG. 5.

Next, it is determined by the foreground information generating unit 11 whether the frame acquired in step B1 is a key frame (step B2).

If the result of the determination in step B2 is that the frame acquired in step B1 is not a key frame, the frame difference generating unit 25 of the foreground information generating unit 11 extracts a difference between the frame acquired in step B1 and a key frame that is closest in time to the frame acquired in step B1, and generates difference information using the extracted difference (step B3).

Next, the intermediate feature map acquiring unit 31 executes preprocessing on the intermediate feature map acquired in later-described step B6 or B7 that was executed earlier, and inputs the preprocessed intermediate feature map to the foreground information generating unit 11 (step B4). Here, as an example of the preprocessing, processing for matching the dimensions of the intermediate feature map with the dimensions of the difference information and the frame, for example.

Next, the foreground information generating unit 11 inputs the difference information generated in step B3, the preprocessed intermediate feature map obtained in step B4, and the frame acquired in step B1 to the second neural network model 21 and thereby generates foreground information (step B5).

Next, the model applying unit 12 applies, to the neural network model 20, the frame acquired in step B1, the difference information generated in step B3, and the foreground information generated in step B5 (step B6). When step B6 is executed, the intermediate feature map acquiring unit 31 acquires an intermediate feature map from the intermediate layer of the neural network model 20 as mentioned above.

Furthermore, if the result of the above-described determination in step B2 is that the frame acquired in step B1 is a key frame, the processing by the foreground information generating unit 11 is not executed, and the model applying unit 12 applies the frame acquired in step B1 to the neural network model 20 (step B7). The intermediate feature map acquiring unit 31 also acquires an intermediate feature map from the intermediate layer of the neural network model 20 as mentioned above if step B7 is executed.

After executing step B6 or B7, the model applying unit 12 outputs the result output from the neural network model 20 to the outside (step B8). As examples of the output destination, a monitoring-system control apparatus, etc., can be mentioned, for example, similarly to the first example embodiment. Furthermore, the above-described steps B1 to B8 are repeatedly executed until an instruction to terminate processing is provided.

Effects of Second Example Embodiment

Because foreground information is also applied to the neural network model 20, in addition to conventionally used difference information also in the second example embodiment as described above, the problem that a decrease in recognition accuracy occurs as a result of a slight movement of the camera, and the problem that camera noise is extracted as differences are resolved. Due to this, according to the second example embodiment as well, a decrease in processing speed can be suppressed while maintaining recognition accuracy in image processing in which video frame is input, or specifically, in a neural network to which video frame is input, similarly to the first example embodiment. In addition, because the accuracy of a target presence region in foreground information is enhanced in the second example embodiment as described above, recognition accuracy is also improved.

[Program]

It suffices for the program in the second example embodiment to be a program that causes a computer to carry out steps B1 to B8 illustrated in FIG. 8. By installing this program on a computer and executing the program, the image processing apparatus and the image processing method in the second example embodiment can be realized. In this case, one or more processors of the computer function and perform processing as the foreground information generating unit 11, the model applying unit 12, the image-data acquiring unit 13, and the intermediate feature map acquiring unit 31. As examples of the computer, a general-purpose PC, a smartphone, a tablet-type terminal device, an embedded computer, and the like can be mentioned.

Furthermore, in the second example embodiment, the first information storing unit 14 and the second information storing unit 15 may be realized by storing data files constituting the first information storing unit 14 and the second information storing unit 15 in a storage device such as a hard disk provided in the computer, or may be realized by a storage device provided in a different computer.

Furthermore, the program in the second example embodiment may be executed by a computer system constructed from a plurality of computers. In this case, the computers may each function as one of the foreground information generating unit 11, the model applying unit 12, the image-data acquiring unit 13 and the intermediate feature map acquiring unit 31, for example.

First Modification

Figure 9:
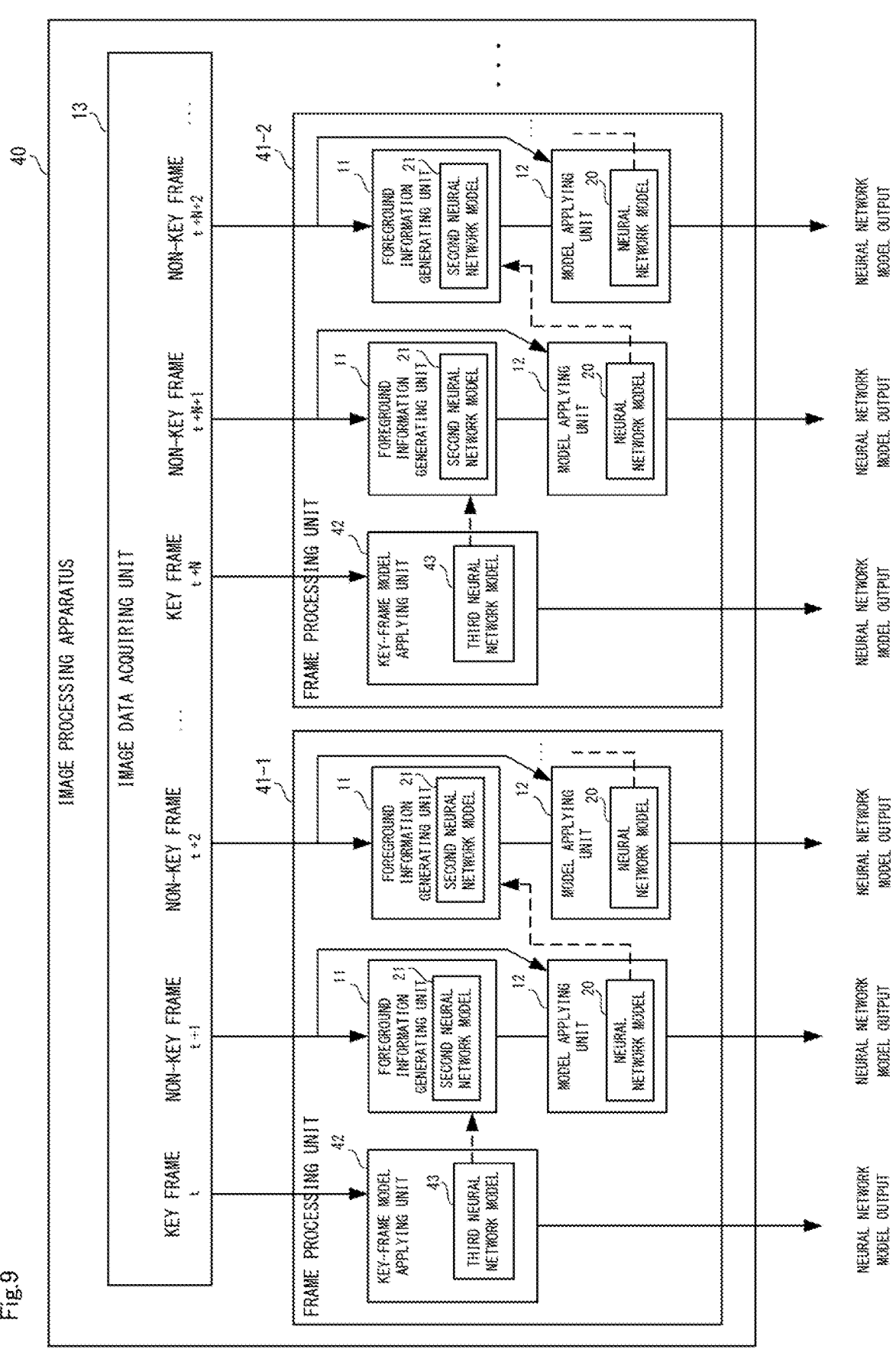
FIG. 9 is a configuration diagram illustrating the configuration of an image processing apparatus in the first modification.

Subsequently, a first modification will be described with reference to FIG. 9. The first modification can be applied to both the first and second example embodiments. FIG. 9 is a configuration diagram illustrating the configuration of an image processing apparatus in the first modification.

As illustrated in FIG. 9, in the first modification, an image processing apparatus 40 includes a plurality of frame processing units 41-1 to 41-N (where N may be any natural number). In the image processing apparatus 40, each frame group constituted by one key frame and m pieces of non-key frames (where m may be any natural number) is processed by one of the frame processing units.

In the example in FIG. 9, a key frame at time t and non-key frames from time t+1 to time t+m are processed by a frame processing unit 41-1, for example. Furthermore, a key frame at time t+N and non-key frames from time t+N+1 to time t+N+m are processed by a frame processing unit 41-2. Note that time t+N is the time immediately after time t+m. In such a manner, in the first modification, processing is performed in units of frame groups each including one key frame.

Furthermore, as illustrated in FIG. 9, each frame processing unit includes one key-frame model applying unit 42, m foreground information generating units 11, and m model applying units 12. The key-frame model applying unit 42 constructs a third neural network model 43, and applies the key frame to the constructed third neural network model 43. Similarly to the neural network model 20, the third neural network model 43 is a neural network model that has performed machine learning of image feature maps of targets.

Note that the first information storing unit 14 and the second information storing unit 15 (see FIGS. 2 and 6) are omitted in FIG. 9. Furthermore, while the image processing apparatus 40 also includes an information storing unit that stores a definition of a structure and parameters for constructing the third neural network model 43, this information storing unit is also omitted in FIG. 9.

In each frame processing unit, the foreground information generating units 11 and the model applying units 12 function as described in the first and second example embodiments. Furthermore, in each frame processing unit, one foreground information generating unit 11 and one model applying unit 12 function as a set. The number of sets is m.

Furthermore, in the first modification, for each frame group, the image-data acquiring unit 13 inputs the key frame to the key-frame model applying unit 42 and inputs the non-key frames to the foreground information generating units 11 and the model applying units 12.

In such a manner, many frames can be processed at once in the first modification. Furthermore, because a key frame and non-key frames are applied to separate neural network models, an improvement in processing speed and an improvement in recognition accuracy can be achieved at a high level.

Furthermore, although not illustrated in FIG. 9, each frame processing unit may include m intermediate feature map acquiring units 21. In this case, the intermediate feature map when a frame corresponding to a given time was applied to a neural network model is extracted, and the extracted intermediate feature map is input to the foreground information generating unit 11 that processes the non-key frame corresponding to the subsequent time. In FIG. 9, the flow of intermediate feature maps is illustrated using broken lines.

Second Modification

Subsequently, a second modification will be described. The second modification can be applied to both the first and second example embodiments. In the above-described first and second example embodiments, the model applying unit 12 applies both foreground information and difference information to the neural network model 20.

In contrast, in the second modification, the model applying unit 12 applies one or both of foreground information generated from an input frame and difference information generated for the input frame to the neural network model 20 in accordance with the state of the camera capturing the video frame.

Here, a case will be considered in which the camera is installed in a vehicle such as an automobile, and moving objects are detected based on outputs. In such a case, as example states of the camera, a state in which the camera is moving due to the vehicle moving, and a state in which the camera is at a standstill due to the vehicle being stopped can be mentioned.

Furthermore, in the former state, in which the camera is moving, it is difficult to detect moving objects using difference information because moving objects around the camera move together with the vehicle in which the camera is installed. Thus, in the former state, in which the camera is moving, the model applying unit 12 applies only foreground information to the neural network model 20.

On the other hand, in the latter state, in which the camera is at a standstill, the presence of automobiles, etc., that are stopped, as is the vehicle in which the camera is installed, is included in foreground information, even though the automobiles, etc., are not moving. Thus, in the latter state, in which the camera is at a standstill, the model applying unit 12 applies only difference information to the neural network model 20.

Third Modification

Subsequently, a third modification will be described. The third modification can also be applied to both the first and second example embodiments. In the third modification, when difference information and foreground information are generated by the foreground information generating unit 11, the model applying unit 12 calculates a logical AND of the difference information and the foreground information. Furthermore, the model applying unit 12 applies the calculated logical AND to the neural network model 20 in place of the difference information and the foreground information.

In a case in which a logical AND as described above is applied to the neural network model 20, it can be expected that a decrease in processing speed will be suppressed to a further extent because the regions in a non-key frame for which the neural network model 20 performs recalculation can be reduced.

Furthermore, the model applying unit 12 can also calculate a logical OR of the difference information and the foreground information in place of the logical AND, and input the calculated logical OR to the neural network model 20. The use of the logical OR may become useful in a case in which the accuracy of the difference information and the foreground information is low.

Fourth Modification

Subsequently, a fourth modification will be described. The fourth modification can be applied only to the first example embodiment. In the fourth modification, the second neural network model 21 is constructed by machine learning in which outputs from the neural network model 20 are used as training data.

Specifically, in the fourth modification, the machine learning of the second neural network model 21 is performed using, as training data, an output from the neural network model 20, in addition to difference information indicating an inter-frame difference, and a corresponding target feature map. As an example of the output, a label corresponding to an input frame can be mentioned. According to the fourth modification, it can be expected that the accuracy of foreground information will improve.

Fifth Modification

Subsequently, a fifth modification will be described. The fifth modification also can be applied only to the first example embodiment. In the fifth modification, the model applying unit 12 calculates a logical OR from pieces of difference information generated for a plurality of frames, and applies the result of the calculation of the logical OR to the neural network model 20.

Specifically, the model applying unit 12 calculates a logical OR of difference information generated from an input frame and difference information generated from a frame corresponding to a different time from that of the input frame. Furthermore, the model applying unit 12 applies, to the neural network model 20, the input frame, the calculated logical OR, and foreground information generated from the input frame.

According to the fifth modification, it can be considered that the parallelization of convolution in the neural network model 20 will be facilitated. Furthermore, it can also be considered that the cost for the gathering of white regions and the scattering to white regions in difference information will be reduced.

[Physical Configuration]

Figure 10:
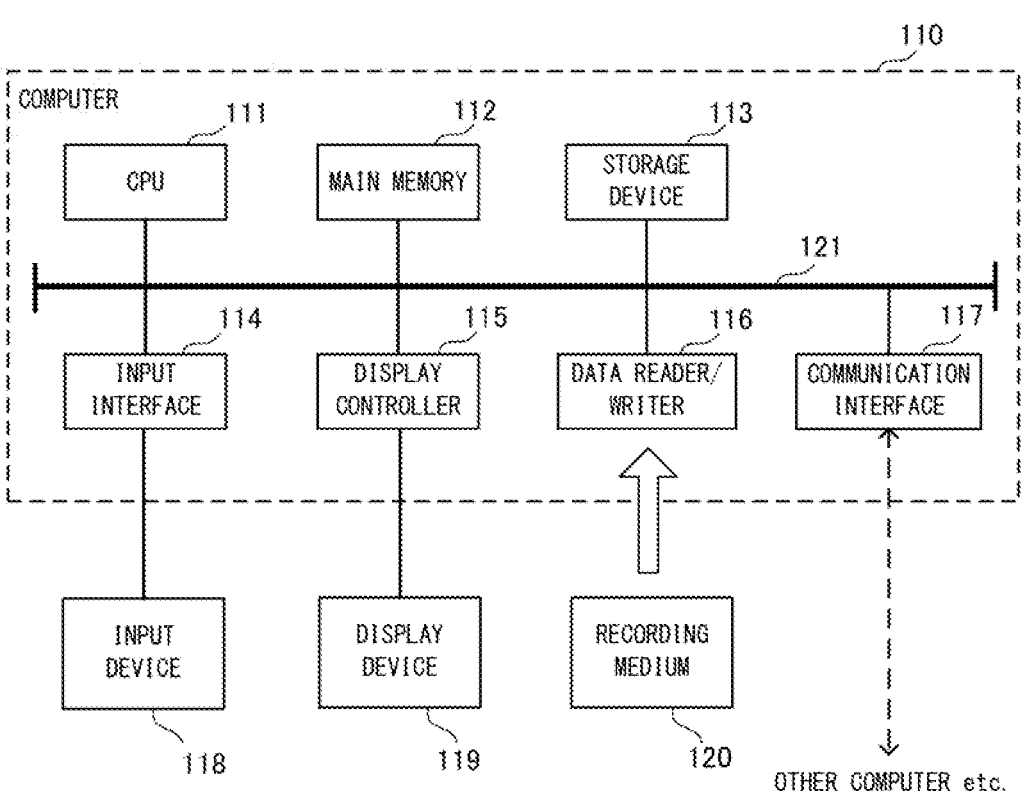
FIG. 10 is a block diagram illustrating an example of a computer that realizes the image processing apparatus according to the first and second example embodiment.

Using FIG. 10, the following describes a computer that realizes the image processing apparatus by executing the program according to the first and second example embodiment. FIG. 10 is a block diagram illustrating an example of a computer that realizes the image processing apparatus according to the first and second example embodiment.

As shown in FIG. 10, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the program according to the example embodiment.

The CPU 111 deploys the program according to the example embodiment, which is composed of a code group stored in the storage device 113 to the main memory 112, and carries out various types of calculation by executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the image processing apparatus according to the example embodiment can also be realized by using items of hardware, for example, electric circuit that respectively correspond to the components rather than the computer in which the program is installed. Furthermore, a part of the image processing apparatus may be realized by the program, and the remaining part of the image processing apparatus may be realized by hardware. In the example embodiment, the computer is not limited to the computer illustrated in FIG. 10.

A part or an entirety of the above-described example embodiment can be represented by (Supplementary Note 1) to (Supplementary Note 24) described below but is not limited to the description below.

(Supplementary Note 1)

An image processing apparatus comprising:

a foreground information generating unit that generates, from a frame constituting video frame, foreground information indicating a region of the frame in which a target is present; and a model applying unit configured to apply the frame and the foreground information generated from the frame to a neural network model that has performed machine learning of an image feature map of the target.

(Supplementary Note 2)

The image processing apparatus according to Supplementary Note 1, wherein, if the frame is a non-key frame, which is a frame other than a key frame that is designated in advance, the foreground information generating unit generates the foreground information from the frame, and further generates difference information indicating a difference between the frame and the key frame that is closest in time to the frame, and the model applying unit applies, to the neural network model, the frame, the foreground information generated from the frame, and the difference information generated for the frame.

(Supplementary Note 3)

The image processing apparatus according to Supplementary Note 2 further comprising:

an intermediate feature map acquiring unit that acquires, in a case in which the neural network model is a neural network, an intermediate feature map from an intermediate layer of the neural network, wherein the foreground information generating unit generates the foreground information and the difference information using the intermediate feature map when a frame earlier than the frame was applied to the neural network model.

(Supplementary Note 4)

The image processing apparatus according to Supplementary Note 2 or 3, wherein the foreground information generating unit generates the foreground information by applying the difference information to a second neural network model that has performed machine learning of an inter-frame difference and the feature map of the target.

(Supplementary Note 5)

The image processing apparatus according to Supplementary Note 2 or 3, wherein the model applying unit applies, to the neural network model, one or both of the foreground information generated from the frame and the difference information generated for the frame in accordance with a state of a camera capturing the video frame.

(Supplementary Note 6)

The image processing apparatus according to Supplementary Note 2 or 3, wherein the model applying unit calculates a logical AND of the foreground information generated from the frame and the difference information generated for the frame, and applies the result of the calculation of the logical AND to the neural network model.

(Supplementary Note 7)

The image processing apparatus according to Supplementary Note 4, wherein the second neural network model has been constructed by machine learning in which outputs from the neural network model are used as training data.

(Supplementary Note 8)

The image processing apparatus according to Supplementary Note 2 or 3, wherein the model applying unit calculates a logical OR from pieces of difference information generated for a plurality of the frames, and applies the result of the calculation of the logical OR to the neural network model.

(Supplementary Note 9)

An image processing method comprising:

a foreground information generating step of generating, from a frame constituting video frame, foreground information indicating a region of the frame in which a target is present; and a model applying step of applying the frame and the foreground information generated from the frame to a neural network model that has performed machine learning of an image feature map of the target.

(Supplementary Note 10)

The image processing method according to Supplementary Note 9, wherein, if the frame is a non-key frame, which is a frame other than a key frame that is designated in advance, in the foreground information generating step, generating the foreground information from the frame, and further generating difference information indicating a difference between the frame and the key frame that is closest in time to the frame, and in the model applying step, applying, to the neural network model, the frame, the foreground information generated from the frame, and the difference information generated for the frame.

(Supplementary Note 11)

The image processing method according to Supplementary Note 10 further comprising:

an intermediate feature map acquiring step of acquiring, in a case in which the neural network model is a neural network, an intermediate feature map from an intermediate layer of the neural network, wherein in the foreground information generating step, generating the foreground information and the difference information using the intermediate feature map when a frame earlier than the frame was applied to the neural network model.

(Supplementary Note 12)

The image processing method according to Supplementary Note 10 or 11, wherein the foreground information generating step, generating the foreground information by applying the difference information to a second neural network model that has performed machine learning of an inter-frame difference and the feature map of the target.

(Supplementary Note 13)

The image processing method according to Supplementary Note 10 or 11, wherein in the model applying step, applying, to the neural network model, one or both of the foreground information generated from the frame and the difference information generated for the frame in accordance with a state of a camera capturing the video frame.

(Supplementary Note 14)

The image processing method according to Supplementary Note 10 or 11, wherein the model applying step, calculating a logical AND of the foreground information generated from the frame and the difference information generated for the frame, and applying the result of the calculation of the logical AND to the neural network model.

(Supplementary Note 15)

The image processing method according to Supplementary Note 12, wherein the second neural network model has been constructed by machine learning in which outputs from the neural network model are used as training data.

(Supplementary Note 16)

The image processing method according to Supplementary Note 10 or 11, wherein the model applying step, calculating a logical OR from pieces of difference information generated for a plurality of the frames, and applying the result of the calculation of the logical OR to the neural network model.

(Supplementary Note 17)

A computer readable recording medium that includes a program recorded thereon, the program including instructions that causes a computer to carry out:

a foreground information generating step of generating, from a frame constituting video frame, foreground information indicating a region of the frame in which a target is present; and a model applying step of applying the frame and the foreground information generated from the frame to a neural network model that has performed machine learning of an image feature map of the target.

(Supplementary Note 18)

The computer readable recording medium according to Supplementary Note 17, wherein, if the frame is a non-key frame, which is a frame other than a key frame that is designated in advance, in the foreground information generating step, generating the foreground information from the frame, and further generating difference information indicating a difference between the frame and the key frame that is closest in time to the frame, and in the model applying step, applying, to the neural network model, the frame, the foreground information generated from the frame, and the difference information generated for the frame.

(Supplementary Note 19)

The computer readable recording medium according to Supplementary Note 18, further the program including instructions that causes a computer to carry out:

an intermediate feature map acquiring step of acquiring, in a case in which the neural network model is a neural network, an intermediate feature map from an intermediate layer of the neural network, wherein in the foreground information generating step, generating the foreground information and the difference information using the intermediate feature map when a frame earlier than the frame was applied to the neural network model.

(Supplementary Note 20)

The computer readable recording medium according to Supplementary Note 18 or 19, wherein the foreground information generating step, generating the foreground information by applying the difference information to a second neural network model that has performed machine learning of an inter-frame difference and the feature map of the target.

(Supplementary Note 21)

The computer readable recording medium according to Supplementary Note 18 or 19, wherein in the model applying step, applying, to the neural network model, one or both of the foreground information generated from the frame and the difference information generated for the frame in accordance with a state of a camera capturing the video frame.

(Supplementary Note 22)

The computer readable recording medium according to Supplementary Note 18 or 19, wherein the model applying step, calculating a logical AND of the foreground information generated from the frame and the difference information generated for the frame, and applying the result of the calculation of the logical AND to the neural network model.

(Supplementary Note 23)

The computer readable recording medium according to Supplementary Note 20, wherein the second neural network model has been constructed by machine learning in which outputs from the neural network model are used as training data.

(Supplementary Note 24)

The computer readable recording medium according to Supplementary Note 18 or 19, wherein the model applying step, calculating a logical OR from pieces of difference information generated for a plurality of the frames, and applying the result of the calculation of the logical OR to the neural network model.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

What is claimed is:

1. An image processing apparatus comprising:
a memory storing program instructions;
at least one processor configured to execute the instructions to implement:
a foreground information generating unit configured to generate, from a frame constituting video frame, foreground information indicating a region of the frame in which a target is present; and
a model applying unit configured to apply the frame and the foreground information generated from the frame to a neural network model that has performed machine learning of an image feature map of the target,
wherein, if the frame is a non-key frame, which is a frame other than a key frame that is designated in advance, the foreground information generating unit generates the foreground information from the frame, and further generates difference information indicating a difference between the frame and the key frame that is closest in time to the frame, and the model applying unit applies, to the neural network model, the frame, the foreground information generated from the frame, and the difference information generated for the frame, the least one processor configured to execute the instructions to further implement:

an intermediate feature map acquiring unit configured to, in a case in which the neural network model is a neural network, acquire an intermediate feature map from an intermediate layer of the neural network, wherein the foreground information generating unit generates the foreground information and the difference information using the intermediate feature map when a frame earlier than the frame was applied to the neural network model.

2. The image processing apparatus according to claim 1, wherein the foreground information generating unit generates the foreground information by applying the difference information to a second neural network model that has performed machine learning of an inter-frame difference and the feature map of the target.

3. The image processing apparatus according to claim 1, wherein the model applying unit applies, to the neural network model, one or both of the foreground information generated from the frame and the difference information generated for the frame in accordance with a state of a camera capturing the video frame.

4. The image processing apparatus according to claim 1, wherein the model applying unit calculates a logical AND of the foreground information generated from the frame and the difference information generated for the frame, and applies the result of the calculation of the logical AND to the neural network model.

5. The image processing apparatus according to claim 2, wherein the second neural network model has been constructed by machine learning in which outputs from the neural network model are used as training data.

6. The image processing apparatus according to claim 1, wherein the model applying unit calculates a logical OR from pieces of difference information generated for a plurality of the frames, and applies the result of the calculation of the logical OR to the neural network model.

7. An image processing method comprising:
generating, from a frame constituting video frame, foreground information indicating a region of the frame in which a target is present; and
applying the frame and the foreground information generated from the frame to a neural network model that has performed machine learning of an image feature map of the target,
wherein, if the frame is a non-key frame, which is a frame other than a key frame that is designated in advance, generating the foreground information from the frame, and further generating difference information indicating a difference between the frame and the key frame that is closest in time to the frame, and
applying to the neural network model, the frame, the foreground information generated from the frame, and the difference information generated for the frame,
in a case in which the neural network model is a neural network, acquiring an intermediate feature map from an intermediate layer of the neural network, wherein the foreground information and the difference information are generated using the intermediate feature map when a frame earlier than the frame was applied to the neural network model.

8. A non-transitory computer readable recording medium that includes a program recorded thereon, the program including instructions that causes a computer to carry out the steps of:

generating, from a frame constituting video frame, foreground information indicating a region of the frame in which a target is present; and applying the frame and the foreground information generated from the frame to a neural network model that has performed machine learning of an image feature map of the target, wherein, if the frame is a non-key frame, which is a frame other than a key frame that is designated in advance, generating the foreground information from the frame, and further generating difference information indicating a difference between the frame and the key frame that is closest in time to the frame, and applying to the neural network model, the frame, the foreground information generated from the frame, and the difference information generated for the frame, in a case in which the neural network model is a neural network, acquiring an intermediate feature map from an intermediate layer of the neural network, wherein the foreground information and the difference information are generated using the intermediate feature map when a frame earlier than the frame was applied to the neural network model.

\* \* \* \* \*